United States Patent
Mittermiller et al.

(10) Patent No.: US 11,142,638 B2
(45) Date of Patent: Oct. 12, 2021

(54) HIGHLY DAMPING ELASTOMERIC POLYMER

(71) Applicant: Zeon Chemicals L.P., Louisville, KY (US)

(72) Inventors: Andrew Mittermiller, Louisville, KY (US); Andrew Goodwin, Georgetown, IN (US)

(73) Assignee: ZEON CHEMICALS L.P., Louisville, KY (US)

( * ) Notice: Subject to any disclaimer, the term of this patent is extended or adjusted under 35 U.S.C. 154(b) by 65 days.

(21) Appl. No.: 16/556,517

(22) Filed: Aug. 30, 2019

(65) Prior Publication Data
US 2020/0071521 A1  Mar. 5, 2020

Related U.S. Application Data (60) Provisional application No. 62/725,662, filed on Aug. 31, 2018.

(51) Int. Cl.
| | | |
|---|---|---|
| C08L 71/03 | (2006.01) | |
| C08L 33/12 | (2006.01) | |
| C08K 3/013 | (2018.01) | |
| C08K 3/34 | (2006.01) | |
| C08K 3/36 | (2006.01) | |

(52) U.S. Cl.
CPC .............. *C08L 71/03* (2013.01); *C08K 3/013* (2018.01); *C08K 3/346* (2013.01); *C08K 3/36* (2013.01); *C08L 33/12* (2013.01)

(58) Field of Classification Search
CPC ......... C08L 71/03; C08L 33/12; C08K 3/013; C08K 3/346; C08K 3/36; C08G 65/24
See application file for complete search history.

(56) References Cited

U.S. PATENT DOCUMENTS 4,288,570 A * 9/1981 Coran ................. C08L 33/12
525/133

FOREIGN PATENT DOCUMENTS

| EP | 0884361 A1 | 12/1998 | |
| JP | H11302493 A | * 11/1999 | .............. C08L 33/12 |

OTHER PUBLICATIONS

Yamanaka et al.; Polymer Journal, 1998, vol. 30, No. 3, p. 210-214.*
Olin; Epichlorohydrin Product Stewardship Manual, 2016, p. 1-31.*
Manoj, N.R., et al., "Vibration damping materials based on interpenetrating polymer networks of carboxylated nitrile rubber and poly(methylmethacrylate)," Polymers for Advanced Technologies, Sep. 2002, 13(9):644-648, 5 pgs.
Roland, C.M., "Interpenetrating Polymer Networks (IPN): Structure and Mechanical Behavior," in: Kobayaski, S., Mullen,K., (eds) Encyclopedia of Polymeric Nanomaterials, Springer-Verlag, Berlin, Heidelberg, 2013, 9 pgs.
Singh, R.K., et al., "Passive Vibration Damping Using Polymer Pads With Microchannel Arrays," Journal of Microelectromechanical Systems, Jun. 2013, 22(3):695-707, 13 pgs.
Sophiea, D., et al., "Interpenetrating Polymer Networks as Energy-Absorbing Materials," Ch. 2, in Advances in Chemistry, 1994 American Chemical Society, vol. 239, pp. 39-75, 37 pgs.
Fernandes, A. C., J. W. Barlow, and D. R. Paul. "Blends containing polymers of epichlorohydrin and ethylene oxide. Part I: Polymethacrylates." *Journal of applied polymer science* 32.6 (1986): 5481-5508.
Min, K. E., et al. "A completely miscible ternary blend: poly (methyl methacrylate)-poly(epichlorohydrin)-poly(ethylene oxide)." *Polymer* 28.10 (1987): 1721-1728.

* cited by examiner

*Primary Examiner* — Robert S Jones, Jr.
(74) *Attorney, Agent, or Firm* — BakerHostetler (57) ABSTRACT

A highly damping homogenous elastomeric polymer blend. The elastomeric polymer blend comprises from about 50% to about 95 wt % epihalohydrin and from about 5% to about 50 wt % polymethylmethacrylate. The blend is homogenous and has a vertical rebound between 0 and about 10% and a Tg between about −20° C. and about 45° C. when measured by rheology.

8 Claims, 5 Drawing Sheets

HIGHLY DAMPING ELASTOMERIC POLYMER

CROSS REFERENCE TO RELATED APPLICATIONS

The present application hereby claims the benefit of the provisional patent application of the same title, Ser. No. 62/725,662, filed on Aug. 31, 2018, the disclosure of which is herein incorporated by reference in its entirety.

BACKGROUND

Rubber materials are typically used to absorb vibration and noise due to their durability, resilience, and ability to absorb impact while compressed. Depending on the specific rubber material, rubber will absorb an impact and transform the energy to heat through hysteresis. The impact transformed to heat versus the energy returned describes a material's resilience or conversely damping ability. These rubber materials must also be low cost and able to survive harsh environments such as in automobiles or in heavy equipment where vibration and noise is to be controlled. These aggressive environments involving prolonged exposure to heat, oil, ozone, and high loads will deteriorate and destroy many elastomeric materials.

BRIEF SUMMARY

A highly damping homogenous elastomeric polymer blend. The elastomeric polymer blend comprises from about 50% to about 95 wt % epihalohydrin and from about 5% to about 50 wt % polymethylmethacrylate. The blend is homogenous and has a vertical rebound between 0 and about 10% and a Tg between about −20° C. and about 45° C. when measured by rheology.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

DETAILED DESCRIPTION

A specific blend ratio of polyether polymer and polymethylmethacrylate polymer mixed by solvation and dried creates a unique elastomer which has more damping potential and usefulness in its application than either material itself. The elastomeric rubber is of appropriate hardness for use as a pad or seal where compression can be applied while the material retains its ability to dampen and absorb vibration while also being resistant to oils, hydrocarbons, and elevated temperatures.

The tangent of delta, or tan delta, is the slope of storage versus loss and quantifies the way a material dissipated vibration and impact energy. This loss factor being higher means that more energy is absorbed by the material compared to storage and rebound. High energy storage will result in very poor vibration control compared to a material that can absorb the energy. Dynamic Mechanical Analysis (DMA) instruments and rheometer instruments can apply a force to a material and measure the resulting force and phase across a temperature range. This initial force and resulting force give the storage and loss moduli, which can then be used to calculate the tangent delta (tan delta). Materials that have a higher loss modulus have higher tan delta and are more ideal for damping applications because they absorb the force (deformation energy) rather than store it. Materials have a higher tan delta at their glass transition temperature (Tg) due to the shift between liquid and solid phases, with the tan delta theoretically peaking at the Tg. The relationship between tan delta and temperature is unique for every material and may have a wider or more narrow temperature range where the tan delta (damping ability) is higher. Most ideal for damping is a material where the tan delta curve is very broad to cover a wide range of temperature, as well as overall higher tan delta outside of Tg phase transition.

Typically, synthetic rubbers have a Tg between about −50° C. and about −20° C. so that they can remain flexible in cold winter climates. This creates a tan delta peak that is well below temperatures of typical applications where damping and vibration control is useful, such as hot machinery/engines or manufacturing environments. By having a Tg at or above ambient operating temperatures the rubber is in its glassy state and no longer compressible to be useful as a seal or pad. We have found that it is ideal for a material to have a high and very wide tan delta curve but a Tg below ambient temperature. Combining a second material of higher Tg can increase the Tg of the base material but must be mixed homogenously to create one single Tg in order to be effective.

The elastomeric polymer blend comprises from about 50 to about 95 wt % epihalohydrin and from about 5 to about 50 wt % plastic polymer polymethylmethacrylate. In some embodiments, the polymer blend comprises from about 50 to about 90 wt % epihalohydrin and from about 10 to about 50 wt % plastic polymer polymethylmethacrylate. It is a homogeneous blend, which means that there are no particles or separate domains. The blend has a vertical rebound of between 0 and about 10%. The vertical rebound is tested using the ASTM D2632 procedure, where a metal plunger is dropped from a height to the surface of the material. The ratio of the rebound distance to the distance the metal plunger fell is the vertical rebound. The blend has a Tg between about −20° C. and about 45° C.

Epihalohydrin can be produced in solution by Ziegler-Nata oxirane ring opening polymerization. Examples of epihalohydrin include, but are not limited to epichlorohydrin, epibromohydrin, epiiodohydrin, epifluorohydrin, and combinations thereof. In some embodiments, the epihalohydrin is selected from epichlorohydrin, epibromohydrin, and combinations thereof. In some embodiments, the epihalohydrin is epichlorohydrin.

The epihalohydrin has a Mooney viscosity, which is measured by the standard Mooney viscosity test (ASTM D1646). In some embodiments, the Mooney viscosity of the epihalohydrin is from about 10 to about 120, such as about 40 to about 80, and about 40 to about 50.

The elastomeric blend comprises polymer polymethylmethacrylate (PMMA). The polymethylmethacrylate may be produced by radical polymerization. In some embodiments, the molecular weight is from about $10^3$ to about $10^7$, such as about $10^3$ to about $10^5$ g/mole.

The elastomeric blend is formed by mixing the epihalohydrin and polymethylmethacrylate in a solvent solution. The polymers are dissolved, blended, and dried. The elastomeric compound is made by mixing any fillers, plasticizers, polymer blends, or other additives, and the cure system to the elastomeric blend. The elastomeric compound is shaped by molding, extrusion, or calendaring, then it is vulcanized or cured to form the elastomeric rubber.

The damping article may be prepared by conventional methods, using a mixing device such as a rubber mill or an internal mixer. In a typical process, the elastomeric blend is added to an internal mixer and mixed for about 0.5 to 4 minutes. Processing aids are added to the elastomeric blend and the mixing is continued for about 2 to 10 minutes. Any fillers, pigments, reinforcing agents, plasticizers or other additives may be added during this mixing cycle to form the master batch.

The master batch is finished, for example by the addition of a chlorine cure system such as a metal oxide acid acceptor and triazine curative, which are added to the master batch to form the elastomeric compound, and mixing is continued for about 3 to 10 minutes. On completion of mixing, the formed compound is formed into sheets on a two-roll mill. These sheets can be readily formed into the desired shape or configuration by molding, extruding, or calendaring at temperatures from around 140° C. to around 200° C. Variations of the described process, including different times or temperatures, different orders of addition of ingredients, and the like, are envisioned. The actual process of preparing the formulations is not critical and the above description is illustrative only.

In some embodiments, the elastomeric blend is compounded with rubber process aids, antioxidants, fillers, plasticizers, and cure system to create a thermoset rubber compound. This rubber compound can then be molded and vulcanized to create an article such as a pad, seal, mount, cushion, foam, roller, or specific shape that could be useful where impact and vibration would be desirably reduced.

In some embodiments, the elastomeric rubber is colored, such as by pigment. In some embodiments, the elastomeric rubber is black and is colored by carbon black.

The elastomeric rubber is vulcanized elastomeric compound. In some embodiments, the elastomeric compound comprises the elastomeric polyether, PMMA, a filler/plasticizer system, and a cure system. In some embodiments, the elastomeric compound comprises about 20 to about 100 phr (parts per hundred rubber by weight) elastomeric polyether/polymethmethacrylate blend, such as about 50 to about 100 phr and about 80 to about 100 phr elastomeric polyether/polymethmethacrylate blend, mixed with other materials such as ethylene propylene diene rubber (EPDM), nitrile rubber (NBR), styrene butadiene rubber (SBR), chloroprene rubber (CR), chlorosulfonated polyethylene (CSM), polyvinyl chloride (PVC), acrylonitrile butadiene styrene (ABS), or a combination thereof. The filler system may be 0 to about 100 phr filler, such as the range of about 0 to about 40 phr. In some embodiments, the elastomeric rubber consists of the elastomeric polyether/polymethmethacrylate blend and the cure system.

In some embodiments, the elastomeric compound comprises one or more plasticizer. Examples of plasticizers include, but are not limited to monomeric adipate ("Plasthall 7006" supplied by Hallstar), monomeric diester ("Plasthall 7050" supplied by Hallstar), dibutoxyethoxyethyl formal ("TP-90b" supplied by Hallstar), mixed ether ester ("TP-759" supplied by Hallstar), dibutoxyethoxyethyl adipate ("TP-95" supplied by Hallstar), polyester adipate ("Paraplex G50" supplied by Hallstar), polyester sebacate ("Paraplex G-25" supplied by Hallstar), or any other monomeric or polymeric plasticizer that would reduce hardness, reduce compound Mooney viscosity, or reduce overall cost of the compound by allowing for increased filler levels. Plasticizer loadings may be from total 0-50 phr in the elastomeric compound, such as from about 0 to about 30 phr, and from about 20 to about 30 phr. In some embodiments, the plasticizer is dibutoxyethoxyethyl formal and monomeric diester.

In some embodiments, the elastomeric compound comprises one or more filler, such as rubber polymers, mineral fillers, and carbon black. Examples of rubber polymer fillers include, but are not limited to ethylene propylene diene rubber (EPDM), nitrile rubber (NBR), styrene butadiene rubber (SBR), chloroprene rubber (CR), chlorosulfonated polyethylene (CSM), polyvinyl chloride (PVC), and acrylonitrile butadiene styrene (ABS). Examples of mineral filler include, but are not limited to silica, silicate, calcium carbonate, clay, titanium oxide, antimony oxide, and a combination thereof. In some embodiments, the mineral filler comprises silica or silicate, clay, or combinations thereof. In some embodiments, the mineral filler comprises silica or silicate. In some embodiments, the elastomeric rubber compound comprises about 0 to about 120 phr carbon black, such as about 30 to about 100 phr, about 20 to about 60 phr, and about 30 to about 50 phr. The filler may be modified to adjust the hardness, tensile strength, and tear strength of the molded article.

Examples of fillers used in non-black rubber compounds include, but are not limited to talc, clay, silica, sodium aluminosilicate, calcium carbonate, antimony trioxide, titanium dioxide, aluminum trihydrate, and combinations thereof. In some embodiments, the filler comprises silica fillers, such as HiSil 233 (supplied by PPG). In some embodiments, the filler comprises calcium carbonate used in the range of about 0 to about 10 phr loading.

In some embodiments, the cure system is a chlorine cure system, which consists 1 phr stearic acid, 3-10 phr acid acceptor such as calcium carbonate, magnesium oxide, magnesium hydroxide, hydrotalcite, or a combination thereof, 0-2 phr 2,4,6-trimercapto-s-triazine, 0-1 phr diphenyl guanidine, and 0-1 phr of treated aromatic sulphonamide.

The elastomeric rubber will have physical characteristics such as hardness, elongation, volume resistance, and tensile strength that will affect its performance as a damping material. In some embodiments, the elastomeric rubber has a Shore A hardness of about 30 to about 80. In some embodiments, the elastomeric rubber has an elongation of about 100% to about 1500%, such as 200% to about 1200%, about 200% to about 1000%, about 300% to about 800%. In some embodiments, the elastomeric rubber has a tensile strength of about 500 to about 3000 psi, such as about 1200 to about 2500 psi or about 1500 to about 2500 psi.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

Example 1

An ASTM slab and ASTM button were prepared by compression molding an elastomeric compound containing 100 phr Hydrin Polymer A (as shown in Table 3), 5 phr ground calcium carbonate filler ("Atomite Whiting"), 60 phr N990 carbon black ("Sterling 1120" supplied Cabot Corp), 15 phr monomeric diester ("Plasthall 7050" supplied by Hallstar), 15 phr dibutoxyethoxyethyl formal ("TP-90b" supplied by Hallstar), 1 phr aromatic amine ("Vanox CDPA" supplied by Vanderbilt Chemicals), 0.5 phr methyl mercapto benzimidazole ("Vanox MTI" supplied by Vanderbilt Chemicals), 1 phr fatty acid ester ("WB222" supplied by Struktol), 1 phr stearic acid ("Industrene R" supplied by HB Chemical), 2 phr magnesium oxide ("MagLite D" supplied by Hallstar), 2,4,6-trimercapto-s-triazine ("Zisnet F-ET" supplied by Zeon Chemicals), diphenyl guanidine ("Accelerator DPG" supplied by Akrochem), and an aromatic sulfonamide ("Retarder SAFE" supplied by Akrochem).

The above compound was mixed by open two-roll rubber mill and shaped into preform appropriate for compression molding a sheet of approximately 150 mm length by 150 mm width by 2 mm thickness and button of 12.5 mm diameter and 6 mm thickness. The unvulcanized rubber was vulcanized for 20 minutes at 170° C. at constant heat and pressure resulting in a cured rubber slab and cured rubber button.

Physical properties of the example compositions were measured based on ASTM D 412 for testing of rubber materials. The hardness was measured by durometer at room temperature by ASTM D 2240 and is reported as Shore A hardness, while the tensile and elongation was measured by ASTM D 412 and are shown in pounds per square inch tensile strength at break and percent elongation at break. Physical properties were measured by a United Model MS tensile tester. These values describe the hardness and physical strength of the matting material and relate to usefulness and durability.

The rubber button was used in a precision resiliometer to measure the vertical rebound of the rubber material in accordance with ASTM D2632. The vertical rebound test consists of dropping a metal plunger from a known height onto a firmly supported rubber specimen and measuring the height of rebound. A higher rebound indicates less damping property of the material.

Examples 2-3

Examples 2 and 3 show that when a homogenous elastomeric rubber blend is used the effect of the polymethylmethacrylate within the polyether/polymethylmethacrylate blend will improve the damping and vibration control of the polymer composition. ASTM slabs and ASTM buttons were prepared by compression molding an elastomeric compound containing Hydrin Polymer blends B and C (as shown in Table 3), 5 phr ground calcium carbonate filler ("Atomite Whiting"), 1 phr aromatic amine ("Vanox CDPA" supplied by Vanderbilt Chemicals), 0.5 phr methyl mercapto benzimidazole ("Vanox MTI" supplied by Vanderbilt Chemicals), 1 phr fatty acid ester ("WB222" supplied by Struktol), 1 phr stearic acid ("Industrene R" supplied by HB Chemical), 2 phr magnesium oxide ("MagLite D" supplied by Hallstar), 2,4,6-trimercapto-s-triazine ("Zisnet F-ET" supplied by Zeon Chemicals), diphenyl guanidine ("Accelerator DPG" supplied by Akrochem), and an aromatic sulfonamide ("Retarder SAFE" supplied by Akrochem).

The phr (parts hundred rubber) is above 100 phr for the elastomeric blends due to the standard formulation and stoichiometry of rubber cure systems to maintain similar levels of curatives and accelerators within the compound. The polymethylmethacrylate contained within the polymer blend does not interact with the polyether cure system crosslinking and thus should not be included as part of the 100 phr rubber, so the phr is then over 100 phr based on the polymethylmethacrylate content within the polyether/polymethylmethacrylate elastomeric blend.

Example 3 became too hard when using 90 phr N990 carbon black so content was reduced to 10 phr to match the hardness of Examples 1 and 2. Higher polymethylmethacrylate content within the elastomeric blend will greatly increase the hardness of the elastomeric blend thus making an ineffective rubber article when intended use it to be a seal or pad that can be compressed.

TABLE 1

Hydrin Polymer Composition

| Hydrin Polymer | epichlorohydrin | polymethylmethacrylate |
|---|---|---|
| A | 100 | 0 |
| B | 75 | 25 |
| C | 50 | 50 |
| D | 90 | 10 |
| E | 80 | 20 |
| F | 70 | 30 |

TABLE 2

Hydrin Rubber Compound Formulation

|  | 1 | 2 | 3 |
|---|---|---|---|
| Hydrin Polymer A | 100.00 | | |
| Hydrin Polymer B | | 133.00 | |
| Hydrin Polymer C | | | 200.00 |
| Calcium Carbonate | 5.00 | 5.00 | 5.00 |
| N990 | 90.00 | 90.00 | 10.00 |
| TP-90b | 15.00 | 15.00 | 15.00 |
| Plasthall 7050 | 15.00 | 15.00 | 15.00 |
| Vanox CDPA | 1.00 | 1.00 | 1.00 |
| Vanox MTI | 0.50 | 0.50 | 0.50 |
| WB222 | 2.00 | 2.00 | 2.00 |
| Stearic Acid | 1.00 | 1.00 | 1.00 |
| Magnesium Oxide | 2.00 | 2.00 | 2.00 |
| Zisnet F-ET | 0.80 | 0.80 | 0.80 |
| DPG | 0.30 | 0.30 | 0.30 |
| Retarder Safe | 0.30 | 0.30 | 0.30 |
| TOTAL | 232.90 | 265.90 | 252.90 |
| Hardness A, (pts) | 46 | 47 | 45 |
| Tensile, (psi) | 1175 | 1444 | 667 |
| Elongation, (%) | 598 | 657 | 349 |
| vertical rebound, (%) | 26 | 6 | 20 |

Example 4-7

Examples 4 through 7 show that when a unique homogenous elastomeric rubber blend is used then only a specific level of polymethylmethacrylate content within the polyether/polymethylmethacrylate blend will improve the damping and vibration control of the polymer composition. Example 4 shows insufficient damping properties due to the low hysteresis of the composition, while examples 5 and 6 show the material is much more suitable for damping applications. Hydrin Polymer F in example 7 showed worse damping performance, illustrating that the polymethylmethacrylate content of the elastomeric blend is too high and thus provides insufficient hysteresis to absorb vibration and dampen impact. An unexpected result is observed at certain polymer blend ratios providing a solution to the described problem to create an elastomeric yet highly damping crosslinked polymeric composition.

ASTM slabs and ASTM buttons were prepared for by compression molding an elastomeric compound containing Hydrin Polymer Blends A, D, E, and F (as shown in Table 5), 5 phr ground calcium carbonate filler ("Atomite Whiting"), 1 phr aromatic amine ("Vanox CDPA" supplied by Vanderbilt Chemicals), 0.5 phr methyl mercapto benzimidazole ("Vanox MTI" supplied by Vanderbilt Chemicals), 1 phr fatty acid ester ("WB222" supplied by Struktol), 1 phr stearic acid ("Industrene R" supplied by HB Chemical), 2 phr magnesium oxide ("MagLite D" supplied by Hallstar), 2,4,6-trimercapto-s-triazine ("Zisnet F-ET" supplied by Zeon Chemicals), diphenyl guanidine ("Accelerator DPG" supplied by Akrochem), and an aromatic sulfonamide ("Retarder SAFE" supplied by Akrochem).

TABLE 3

|  | 4 | 5 | 6 | 7 |
|---|---|---|---|---|
| Hydrin Polymer A | 100.00 | | | |
| Hydrin Polymer D | | 111.00 | | |
| Hydrin Polymer E | | | 125.00 | |
| Hydrin Polymer F | | | | 143.00 |
| Calcium Carbonate | 5.00 | 5.00 | 5.00 | 5.00 |
| Vanox CDPA | 1.00 | 1.00 | 1.00 | 1.00 |
| Vanox MTI | 0.50 | 0.50 | 0.50 | 0.50 |
| WB222 | 1.00 | 1.00 | 1.00 | 1.00 |
| Stearic Acid | 1.00 | 1.00 | 1.00 | 1.00 |
| Magnesium Oxide | 2.00 | 2.00 | 2.00 | 2.00 |
| Zisnet F-ET | 0.50 | 0.50 | 0.50 | 0.50 |
| DPG | 0.30 | 0.30 | 0.30 | 0.30 |
| Retarder Safe | 0.30 | 0.30 | 0.30 | 0.30 |
| TOTAL | 111.60 | 122.60 | 136.60 | 154.60 |
| Hardness A, (pts) | 30 | 34 | 42 | 60 |
| Tensile, (psi) | 262 | 502 | 646 | 1400 |
| Elongation, (%) | 537 | 727 | 703 | 625 |
| vertical rebound, (%) | 7 | 2 | 2 | 14 |

Examples 8-10

Figure 5:
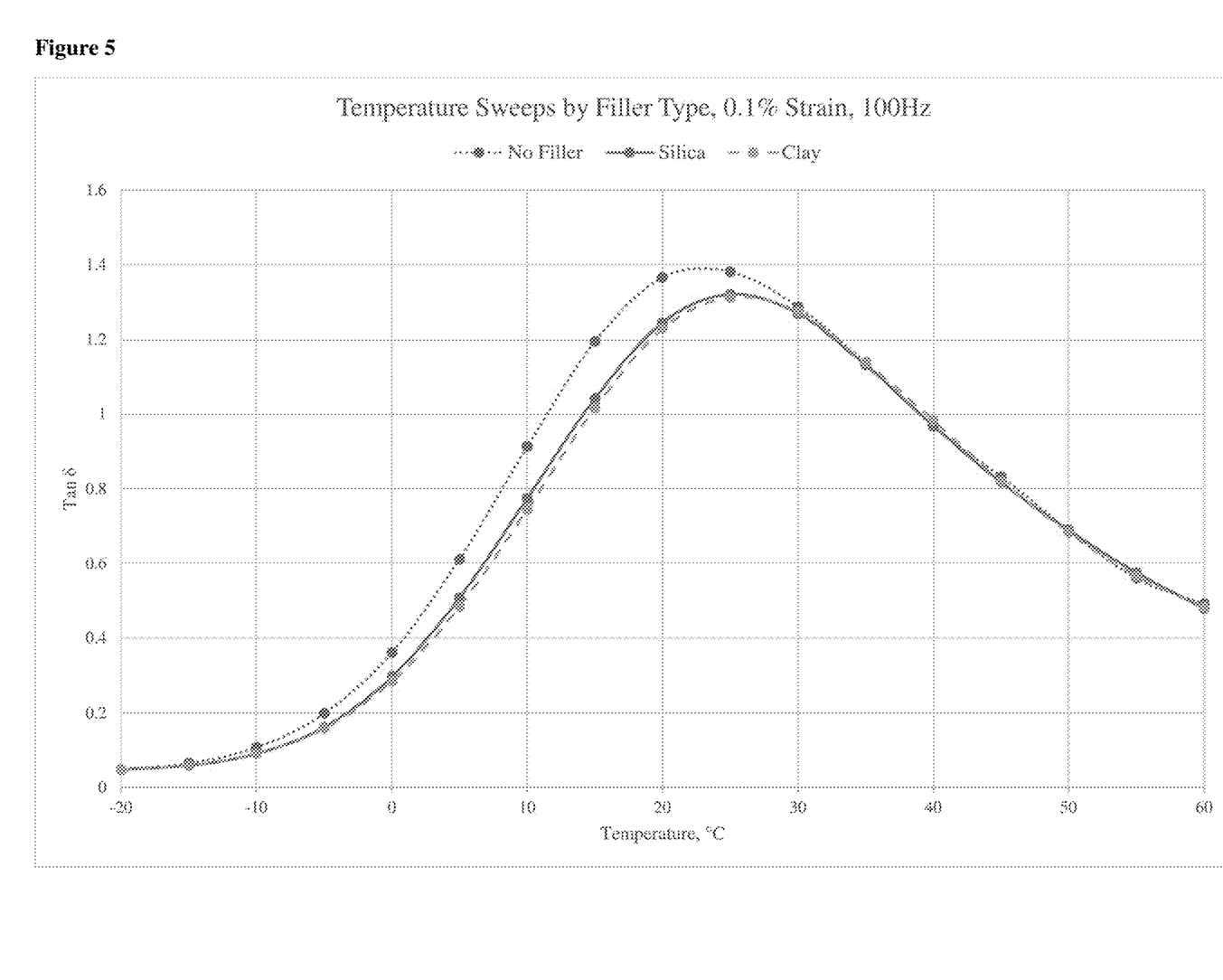
FIG. 5 is a graph of tan delta v. temperature for different filler types.

The damping properties of vulcanized compounds made with the polymer blend remain intact even with the addition of fillers, as mentioned previously, such as silica or clay. ASTM slabs were prepared by compression molding an elastomeric compound containing Hydrin Polymer Blends B (as shown in Table 4), 1.5 phr aromatic amine ("Vanox CDPA" supplied by Vanderbilt Chemicals), 1 phr stearic acid ("Industrene R" supplied by HB Chemical), 5 phr ground calcium carbonate ("Atomite Whiting"), 3 phr magnesium oxide ("MagLite D" supplied by Hallstar), 0.5 phr 2,4,6-trimercapto-s-triazine ("Zisnet F-ET" supplied by Zeon Chemicals), 0.8 phr diphenyl guanidine ("Accelerator DPG" supplied by Akrochem). An second compound containing 30 phr silica ("Hisil 190G" supplied by PPG Industries) and 2 phr mercaptopropyltrimethoxysilane ("A-189" by Momentive) shows that the hardness, and thus ability to bear load, as well as the tensile strength, can be improved without adversely affecting the tan delta and damping performance across a wide temperature range. A third compound containing 40 phr of clay ("Polyfil 70" supplied by KaMin LLC) shows that clay can also be useful to increase hardness without adversely affecting the tan delta and damping performance across a wide temperature range as shown in FIG. 5.

Adhesive-primer ("Chemlok 6150" supplied by Lord Corporation) was applied to metal faces and unvulcanized compounds were placed in between the metal pieces in a cylinder mold and then vulcanized for 15 minutes at 170° C. to create a double-shear test piece. The rubber dimensions were approximately 10 mm in diameter and 2 mm in thickness. The temperature sweeps were tested by in double sheer setup performed on a Metravib DMA+2000 at 0.1% strain and at 100 Hz frequency from 60° C. down to −20° C. in 5° C. intervals.

TABLE 4

| Compounds with Fillers | | | |
|---|---|---|---|
|  | 8 | 9 | 10 |
| Hydrin Polymer B | 133.00 | 133.00 | 133.00 |
| Vanox CDPA | 1.50 | 1.50 | 1.50 |
| Stearic Acid | 1.00 | 1.00 | 1.00 |
| Calcium Carbonate | 5.00 | 5.00 | 5.00 |
| Magnesium Oxide | 3.00 | 3.00 | 3.00 |
| HISIL 190G | | 30.00 | |
| POLYFIL 70 | | | 40.00 |
| A-189 Silane | | 2.00 | |
| Zisnet F-ET | 0.50 | 0.50 | 1.00 |
| DPG | 0.80 | 0.80 | 0.80 |
| TOTAL | 144.80 | 176.80 | 185.30 |
| Hardness A, (pts) | 44 | 60 | 58 |
| Tensile, (MPa) | 3.8 | 10.5 | 7.7 |
| Elongation, (%) | 596 | 532 | 506 |

Example 11-17

Figure 1:
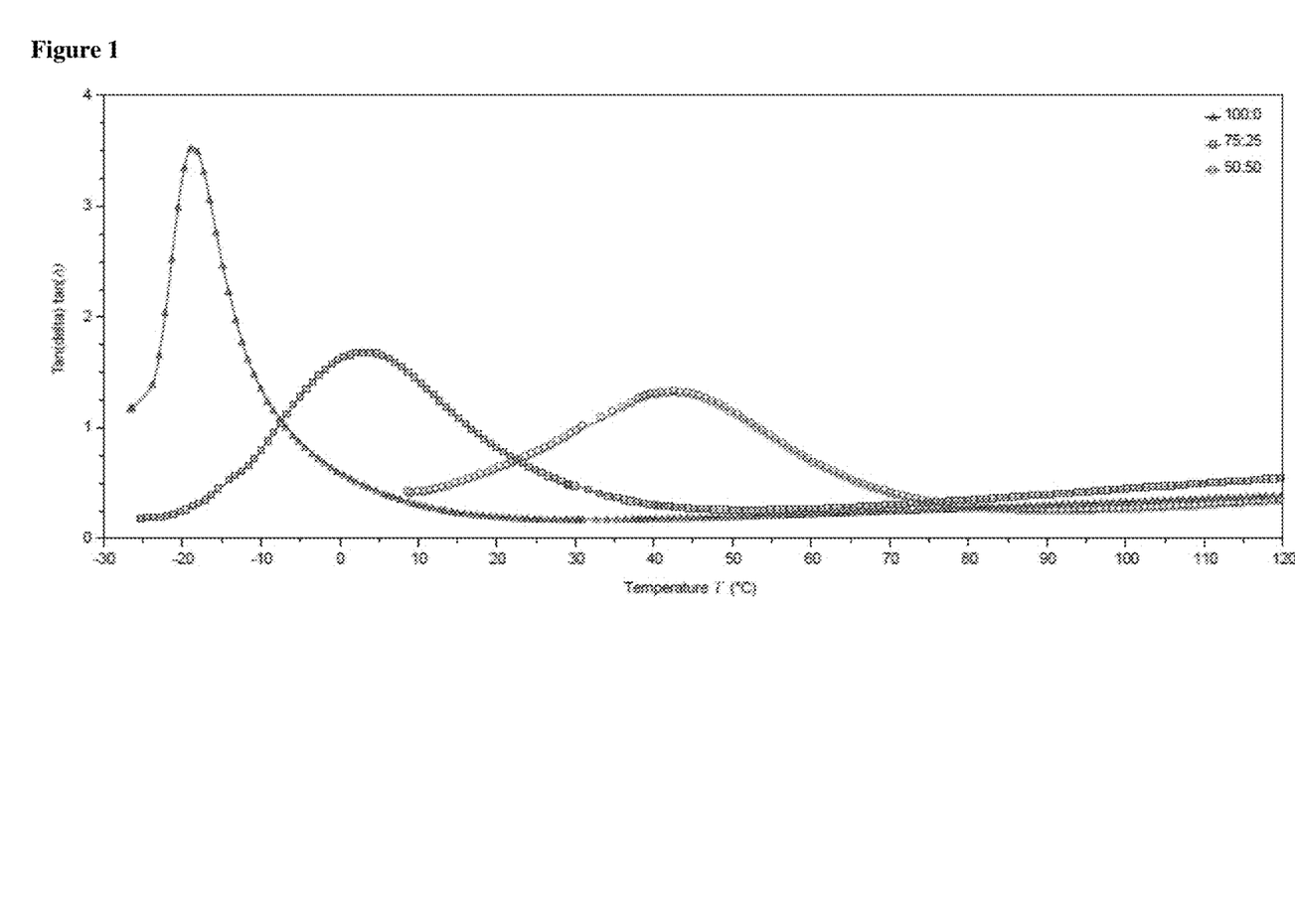
FIG. 1 is a graph of Hydrin PMMA Tan Delta Temperature Sweep.

Rheology is used to determine the damping properties, calculate the polymer Tg, and confirm blend miscibility by measuring the tan delta response over a broad temperature range. Temperature sweep experiments were performed on a parallel plate rheometer from −30° C. to 120° C. with a temperature ramp rate of 5° C./minute at a constant frequency of 1.0 Hz at 0.25% strain, shown in FIG. 1. The damping properties are determined from the tan delta curve, with higher tan delta values corresponding to increased damping character. Additionally, the Tg is reported as the temperature at the tan delta peak maximum, while blend miscibility is confirmed by the presence of a single tan delta peak which shifted from −19° C. to 43° C. resulting from the Hydrin-to-PMMA weight ratio. The materials provide a higher tan delta in a more useful temperature range, such as from −15° C. to 45° C.

TABLE 5

Hydrin PMMA Glass Transition Temperature

| Example | Sample | ECO wt % | PMMA wt % | Tg (degC.) |
|---|---|---|---|---|
| 11 | 100:0 | 100 | 0 | −19 |
| 12 | 75:25 | 75 | 25 | 4 |
| 13 | 50:50 | 50 | 50 | 43 |

Figure 2:
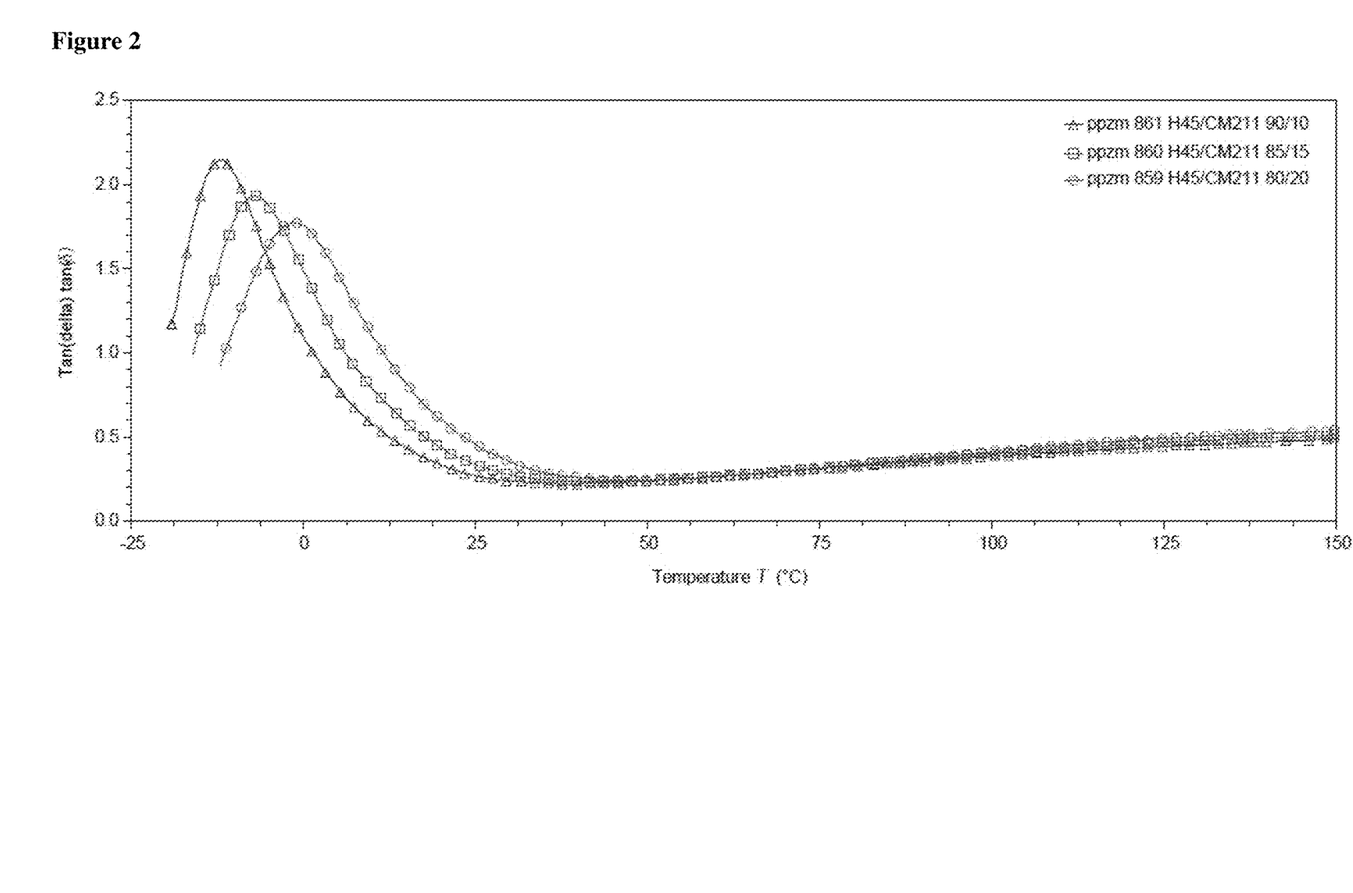
FIG. 2 is a graph of Hydrin PMMA Tan Delta Temperature Sweep.
Figure 3:
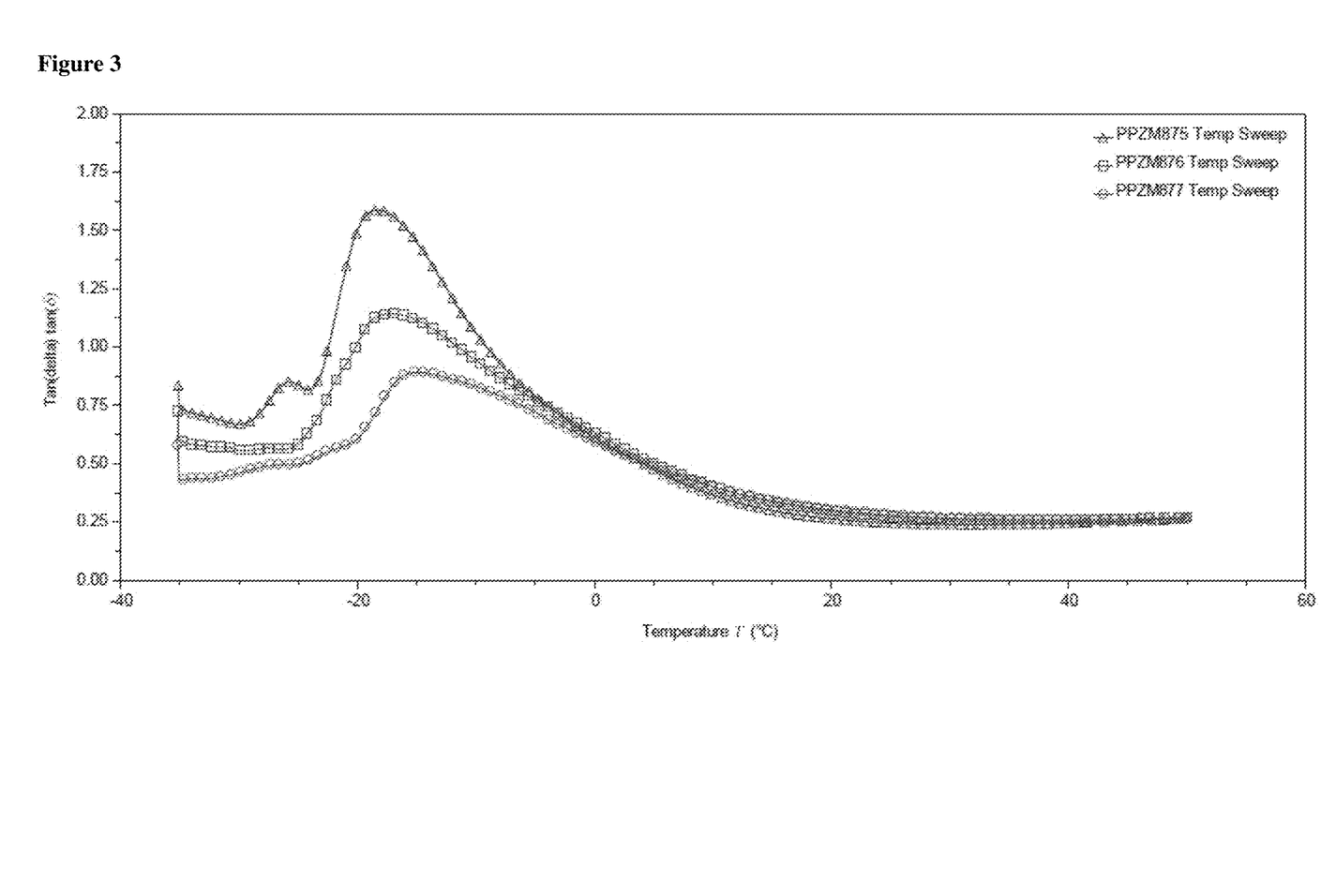
FIG. 3 a graph of Hydrin PC tan delta temperature sweep.
Figure 4:
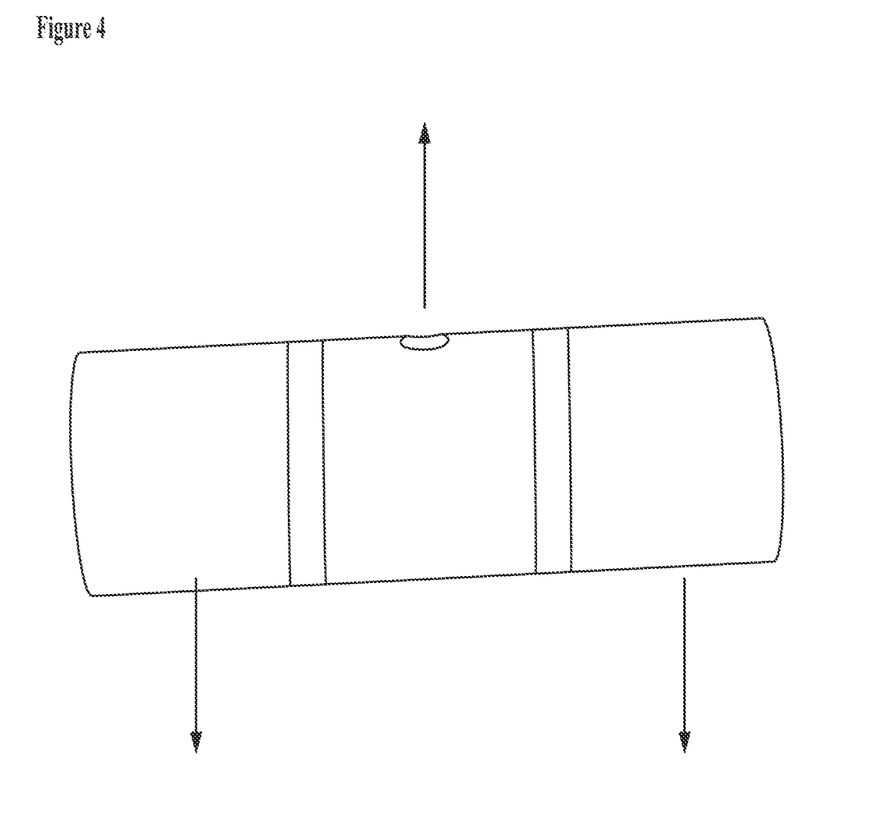
FIG. 4 is a picture of the double shear vulcanized specimen test setup.

Due to the need for low temperature performance, some blends at lower ratios may be preferred so the damping pad or seal may remain rubbery at low operating temperatures of 0° C. or lower, see FIG. 2. Those familiar with typical tan delta of damping materials would agree that a tan delta of greater than 1 can be related to very high damping performance.

TABLE 6

Hydrin PMMA Tan Delta Temperature Sweep

| Example | Sample | PMMA Content (wt %) | Tan Delta | Tg (degC.) |
|---|---|---|---|---|
| 14 | PPZM 859 | 20 | 1.78 | −1 |
| 15 | PPZM 860 | 15 | 1.95 | −7 |
| 16 | PPZM 861 | 10 | 2.17 | −12 |

Examples 17-18

The molecular weight of the polymeric constituents is most ideal when the molecular weight is lowest which gives higher tan delta and thus better damping performance. In regards to amorphous rubber, Mooney viscosity is a good indicator of molecular weight. The standard Mooney viscosity test (ASTM D1646) is used to characterize epihalohydrin by measuring the rotor torque after a 1 minute warm up and 4 minutes of applied force. The final torque at the end of the 4 minutes is the Mooney viscosity. Higher average molecular weight polymers have higher Mooney viscosity torque values. The epichlorohydrin is supplied by Zeon Chemicals LP and sold in Mooney ranges of 40 to 50 ("Hydrin H45"), 50 to 60 ("Hydrin H55"), 60 to 70 ("Hydrin H65"), and 70 to 80 ("Hydrin H75"). Most ideal is a low Mooney from 40 to 50.

The molecular weight of the plastic resin of poly methyl methacrylate (PMMA) can be characterized by Gel Permeation Chromatography (GPC). The GPC instrument used was the Waters 2695 Separations Module with a flow Rate of 1.0 ml/min, and a 7.8×300 mm column, 3×PLgel Mixed Bed B, 10 um packing, using a molecular weight range of 500-10M. The detector used is Waters Model 2410 RI with a sensitivity of 128. The column is held at a constant 30° C. and the test is set up using calibration standards of polystyrene of the below molecular weights. All samples are dissolved in THF.

TABLE 7

GPC Calibration Sample Molecular Weights 7,110,000
5,480,000
3,726,000
1,412,000
1,000,000
949,000
648,800
402,100
357,400
189,300
164,000
66,350
64,560
52,400
48,900
13,648
3,787
2,630
1,410
800

PMMA of lower molecular weight ("CM-211" supplied by Chi Mei) has a lower molecular weight compared to a PMMA of higher molecular weight ("CA-82" supplied by Plaskolite).

TABLE 8

PMMA Molecular Weight

| Sample ID | | Peak Molecular Weight (Mp) | Number Average Molecular Weight (Mn) | Weight Average Molecular Weight (Mw) | Z- Average Molecular Weight (Mz) | Polydispersity (Mw/Mn) |
|---|---|---|---|---|---|---|
| Chi Mei CM-211 PMMA | average | 7.49E+04 | 3.32E+04 | 7.69E+04 | 1.27E+05 | 2.32 |
| | std. dev. | 2.93E+02 | 3.85E+02 | 1.13E+02 | 6.36E+02 | 0.02 |
| Plaskolite CA-82 PMMA | average | 1.10E+05 | 4.70E+04 | 1.14E+05 | 1.94E+05 | 2.44 |
| | std. dev. | 1.39E+02 | 5.28E+02 | 9.48E+01 | 2.07E+02 | 0.03 |

TABLE 9

Hydrin PMMA Effect of Molecular Weight

| | 17 | 18 |
|---|---|---|
| PPZM852 (H45:CM211) | 133.00 | |
| PPZM853 (H75:CA-82) | | 133.00 |
| Vanox MTI | 0.50 | 0.50 |
| Vanox CDPA | 1.00 | 1.00 |
| Stearic Acid | 1.00 | 1.00 |
| Calcium Carbonate | 5.00 | 5.00 |
| Magnesium Oxide | 2.00 | 2.00 |
| Zisnet F-ET | 0.50 | 0.50 |
| DPG | 0.30 | 0.30 |
| Retarder Safe | 0.30 | 0.30 |
| TOTAL | 143.60 | 143.60 |

TABLE 9-continued

Hydrin PMMA Effect of Molecular Weight

|  | 17 | 18 |
|---|---|---|
| Hardness A, (pts) | 45 | 52 |
| Tensile, (MPa) | 4.0 | 6.1 |
| Elongation, (%) | 613 | 626 |
| vertical rebound, (%) | 6 | 9 |

Examples 19-21

Polymethyl methacrylate (PMMA) was found to work well for blending with epihalohydrin polymer due to its similarity in polarity and miscibility once dissolved in toluene, blended in solution, and coagulated to create dried polymer. Other plastic resins may not work as well, such as polycarbonate (PC) which is also similar in polarity but found to not be homogenous in the coagulated and dried form. This incompatibility can be observed by rheology where little or no shift in tan delta is observed despite the Tg of PC being higher than that of PMMA. A higher shift in Tg would be expected by blending with PC than blending with PMMA. No such shift was observed and no improvement in damping properties was realized.

TABLE 10

Hydrin PC Glass Transition Temperature

| Example | Sample | hydrin wt % | PC wt % | Tg (degC.) |
|---|---|---|---|---|
| 19 | PPZM875 | 90 | 10 | −19 |
| 20 | PPZM876 | 85 | 15 | −18 |
| 21 | PPZM877 | 80 | 20 | −15 |

What is claimed is:

1. An elastomeric polymer blend, wherein the elastomeric polymer blend comprises from about 50 to about 95 wt % epihalohydrin and from about 5 to about 50 wt % plastic polymer polymethylmethacrylate, wherein the blend is homogenous, and has a vertical rebound of between 0 and about 10% and a Tg between about −20° C. and about 45° C.

2. The elastomeric polymer blend of claim 1, wherein the epihalohydrin is epichlorohydrin.

3. The elastomeric polymer blend of claim 1, wherein the epihalohydrin has a Mooney viscosity between 10 and 120.

4. The elastomeric rubber blend of claim 1, wherein the polymethylmethacrylate has an average molecular weight between $10^3$ and $10^7$ g/mole.

5. The elastomeric rubber blend of claim 3, wherein the polymethylmethacrylate has an average molecular weight between $10^3$ and $10^7$ g/mole.

6. The elastomeric polymer blend of claim 1, wherein the epihalohydrin and polymethylmethacrylate are homogeneously blended in solution.

7. The elastomeric polymer blend of claim 1, further comprising one or more filler.

8. The elastomeric polymer blend of claim 7, wherein the filler is selected from silica or silicate, clay, or combinations thereof.

* * * * *